3,110,597
COMPOSITION COMPRISING GELATIN AND A POTENTIAL HARDENER THEREFOR
John W. Gates, Jr., and William W. Rees, Rochester, N.Y., assignors to Eastman Kodak Company, Rochester, N.Y., a corporation of New Jersey
No Drawing. Filed Nov. 21, 1961, Ser. No. 154,044
7 Claims. (Cl. 96—111)

This invention relates to a gelatin composition containing therein a compound useful for hardening gelatin under alkaline conditions which compound comprises the combination of acyl-oxy with a suitable ring structure.

In certain photographic applications, particularly in photographic emulsions, it is desirable that the layers of gelatin in the photographic elements be resistant to water at elevated temperatures. Hardeners have been incorporated in gelatin compositions but many of these are of a type that produce undesirable effects on photographic emulsions in contact therewith. For instance, these hardeners may cause incubation fog or they may cause continuation of hardening of the gelatin during storage which is undesirable and may result in development restraint. In some systems employed in color photography, interaction by the hardeners with the color couplers may be encountered.

One object of our invention is to provide gelatin compositions containing delayed action hardeners in which the hardening is not effected until the processing of the photographic emulsion. Another object of our invention is to provide gelatin coating compositions particularly gelatin-silver halide emulsions, in which increased silver coverage is obtained because the coating is a slightly softened composition whose resistance to water increases when contacted with basic compounds. Other objects of our invention will appear herein.

We have found that by the incorporation of certain compounds in gelatin compositions a delayed hardening effect is obtained; that is the gelatin is not affected until contact with basic materials such as would be encountered by contacting the gelatin such as in the form of an emulsion layer or the like with a liquid which exhibits an alkaline effect. It is desirable that the latent hardener be used in a 0.5 to 10% proportion based on the weight of the gelatin in the composition.

The compounds which have been found to be useful as latent hardeners in accordance with our invention are composed of an acyl-oxy grouping combined with a certain ring structure. Upon contacting these compounds with alkaline solutions, the hardening potential for gelatin becomes effective and the resistance of the gelatin to softening by water, especially at elevated temperatures, is promoted.

Compounds which are effective as hardeners for gelatin under alkaline conditions are those like N-chloroacetoxymethylphthalimide which have the following structure:

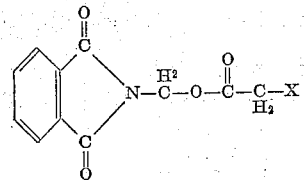

in which X is a halogen substituent. This material may be conveniently prepared as follows:

EXAMPLE 1

A solution of chloroacetyl chloride in benzene was added dropwise with stirring to a mixture of hydroxymethylphthalimide, pyridine and benzene at room temperature. The mixture was stirred for twenty hours. The precipitate obtained was filtered off and was vacuum dried. The product was recrystallized from carbon tetrachloride giving white prisms of N-chloroacetoxymethylphthalimide. It was recrystallized from carbon tetrachloride to give white prisms of N-chloroacetoxymethylphthalimide having a melting point of 107–109° C.

Another related type of compound useful because of its latent hardening properties has the following formula:

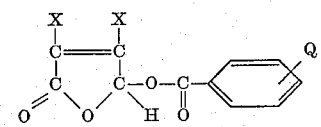

in which formula X is chloride or bromine and Q, which is a single substituent on the benzene ring, is either a nitro or halogen (Cl or Br) substituent. The following examples illustrate the preparation of compounds of this type.

EXAMPLE 2

Equimolar amounts of mucochloric acid and m-bromobenzoyl chloride were heated without solvents to 120° C., following the method described in J.A.C.S., volume 72, page 2535 (1950), for similar compounds. The temperature of the mass was maintained within the range of 110–125° C. until no more hydrogen chloride was given off. The clear melt obtained was poured into ligroin and a solid precipitated out. This solid material was recrystallized from ethanol-water giving a white solid having a melting point 95–97° C. The product obtained was 3,4-dichloro-5-p-bromobenzoyloxy-2-furanone.

EXAMPLE 3

A method similar to that of the preceding examples was employed except that p-nitrobenzoylchloride was used instead of the bromobenzoylchloride of the preceding example. The precipitate obtained was recrystallized from ethanol-water. The resulting product, 3,4-dichloro-5-p-nitrobenzoyloxy-2-furanone, had a melting point within the range of 132–134° C.

It was found that these compounds when incorporated in a gelatin composition and particularly in a gelatin-silver halide emulsion have no adverse photographic effect and hardening is delayed until the gelatin layers containing same are subjected to alkaline conditions.

As an example of the use of these delayed hardeners high speed bromoiodide sulfur and gold sensitized emulsions which had been optically sensitized with a cyanine dye were coated out onto suitable supports both with and without these compounds. Thereafter, the films thus obtained were exposed to light in an Eastman Type 1B sensitometer. The films were then processed in Developer DK-50 for several minutes whereupon the film was fixed, washed, and dried. The relative speeds of the products were observed in terms of the exposure required to produce a density of 0.3 above fog. Melting point data was obtained comparing these layers with hardener, those in which no hardener was incorporated and layers in which formaldehyde had been used. The melting point data was obtained with unprocessed coatings after incubation for one day at 100° F. and with coatings that had been five minutes in developer, for instance (DK-50), with no previous exposure and with no fix or stop bath treatment.

Table I

| Coating No. | Hardener | Hardener, percent on Weight of gel | Fresh | | | 1 wk. 120° F. Incubation | | | M. P. before development, °F. | M. P. after development for 5 min. °F. |
|---|---|---|---|---|---|---|---|---|---|---|
| | | | Speed | α | Fog | Speed | α | Fog | | |
| A | Control | | 100 | 1.20 | .11 | 59 | .87 | .31 | 88 | 104 |
| B₁ | N-Chloro-acetoxymethyl-phthalimide | 1.7 | 95 | 1.18 | .08 | 53 | .78 | .17 | 96 | 180 |
| B₂ | | 5.1 | 91 | 1.22 | .09 | 69 | .93 | .15 | 94 | 170 |
| C₁ | 3,4-Dichloro-5-(p-bromo-benzoyloxy)-2-furanone | 1.2 | 89 | 1.18 | .10 | 41 | .78 | .25 | 82 | 166 |
| C₂ | | 6.0 | 82 | 1.17 | .11 | 45 | .85 | .14 | 84 | 202 |
| D | Formaldehyde | 0.6 | 69 | .87 | .13 | 46 | .30 | .82 | 88 | 110 |

The melting points were determined by placing the various samples in water and gradually raising the temperature of the water in which the film samples were immersed. The melting point was recorded at that point at which the emulsion layer disintegrated or detached itself from the film base on which it had been coated.

The photographic emulsions used in practicing our invention may contain the usual stabilizers, plasticizers, coating aids and speed-increasing compounds.

The addenda which we have described may be used in various kinds of photographic emulsions. In addition to being useful in spectrally sensitized emulsions they may also be used in non-spectrally sensitized emulsions, such as X-ray emulsions.

They may be added to the emulsion before or after any sensitizing dyes which are used. Various silver salts may be used as the sensitive salt such as silver bromide, silver iodide, silver chloride, or mixed silver halides such as silver chlorobromide or silver bromoiodide. The agents may also be used in emulsions intended for color photography, for example emulsions containing color-forming couplers or emulsions to be developed by solutions containing couplers or other color-generating materials, emulsions of the mixed-packet type or emulsions of the mixed-grain type.

These addenda may also be used in emulsions intended for use in diffusion transfer processes which utilize the undeveloped silver halide in the nonimage areas of the negative to form a positive by dissolving the undeveloped silver halide and precipitating it on a receiving layer in close proximity to the original silver halide emulsion layer.

They may also be used in color transfer processes which utilize the diffusion transfer of an image-wise distribution of developer, dye developer, coupler or dye, from a light-sensitive layer to a second layer, while the two layers are in close proximity to one another.

They may also be used in emulsions intended for use in a monobath process or in processes utilizing a processing web.

We claim:
1. A composition comprising gelatin containing therein an acyl-oxy compound selected from the group consisting of

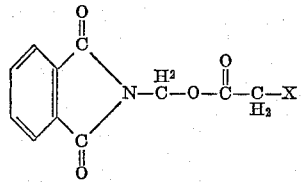

and

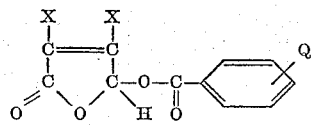

X being halogen and Q being selected from the substituents consisting of nitro and halogen.

2. A composition comprising a gelatin-silver halide photographic emulsion containing therein

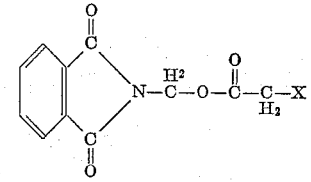

and

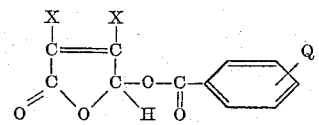

X being halogen and Q being selected from the substituents consisting of nitro and halogen.

3. A composition comprising gelatin containing therein the following compound

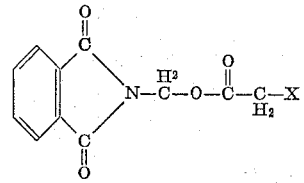

X being halogen.

4. A composition comprising gelatin containing therein a compound having the formula

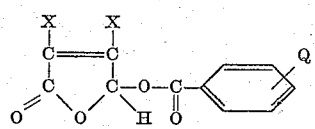

X being halogen and Q being selected from the substituents consisting of nitro and halogen.

5. A gelatin silver-halide photographic emulsion containing therein N-chloroacetoxymethylphthalimide.

6. A gelatin silver-halide photographic emulsion containing therein 3,4 - dichloro-5-(p-bromobenzoyloxy)-2-furanone.

7. A gelatin silver-halide photographic emulsion containing therein 3,4-dichloro-5-(p-nitrobenzoyloxy)-2-furanone.

References Cited in the file of this patent
UNITED STATES PATENTS
2,688,610   Elins et al. _____ Sept. 7, 1954